(No Model.) 2 Sheets—Sheet 1.
W. W. GRISCOM.
ART OF PREPARING ELEMENTS FOR SECONDARY BATTERIES.
No. 405,733. Patented June 25, 1889.
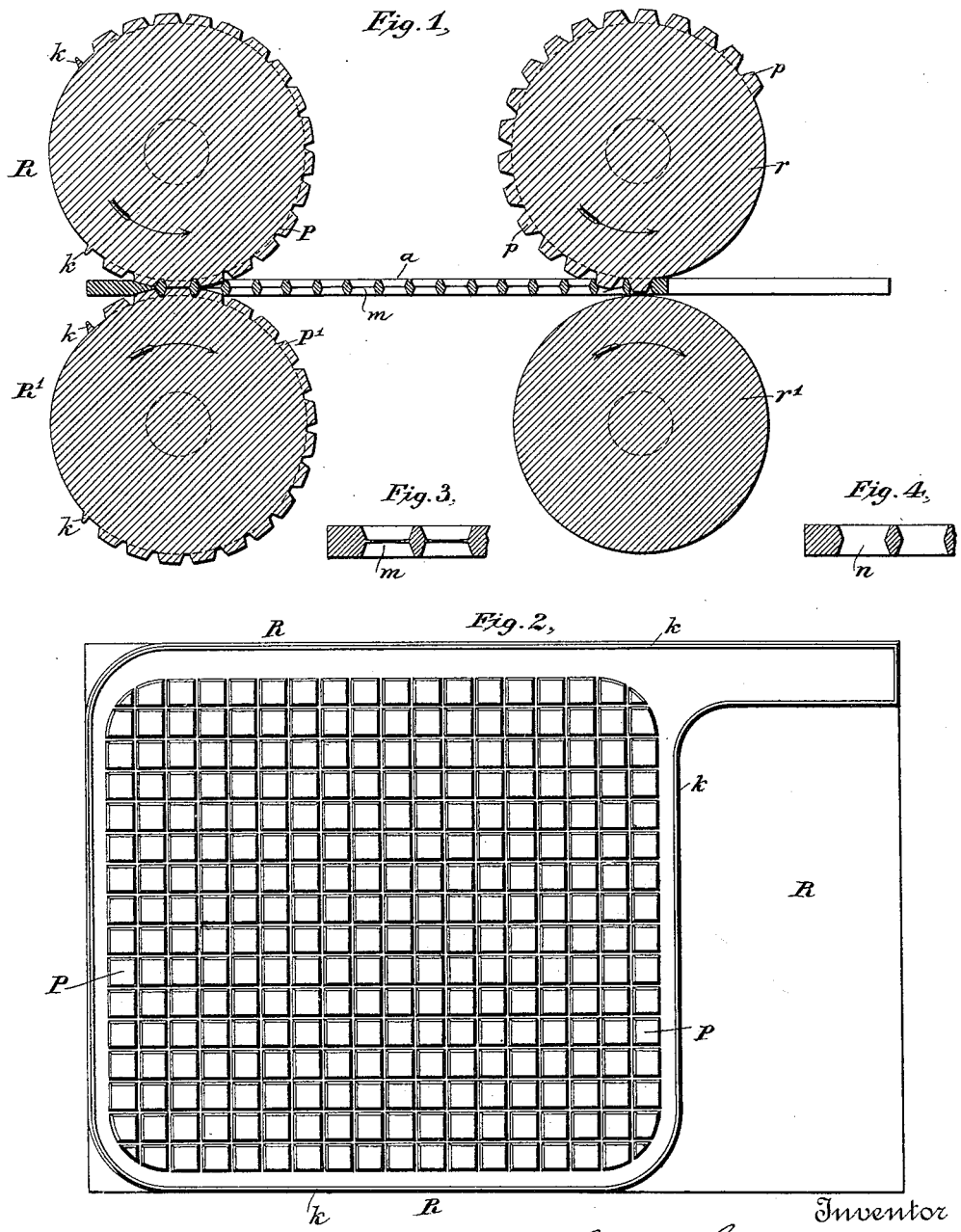

(No Model.) 2 Sheets—Sheet 2.
W. W. GRISCOM.
ART OF PREPARING ELEMENTS FOR SECONDARY BATTERIES.
No. 405,733. Patented June 25, 1889.
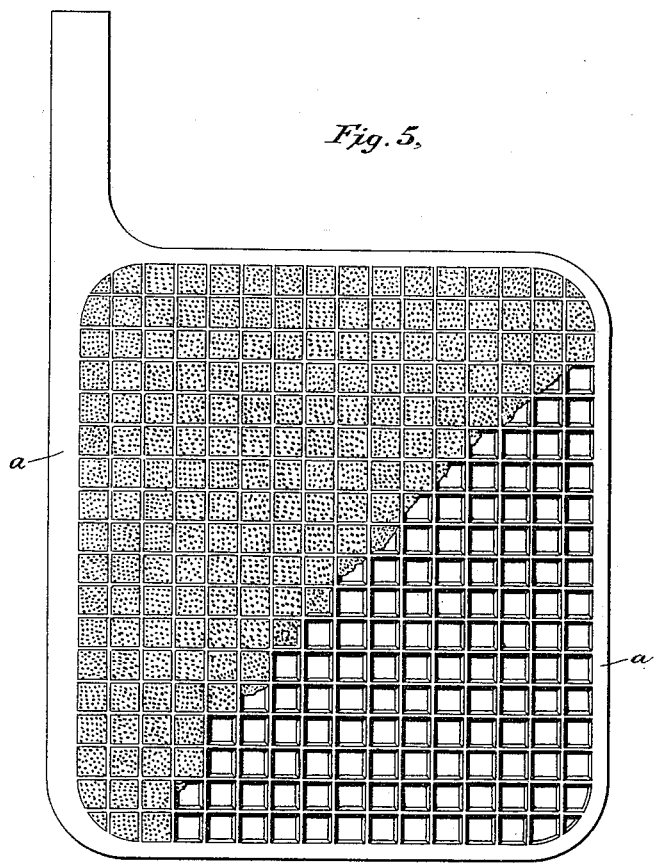
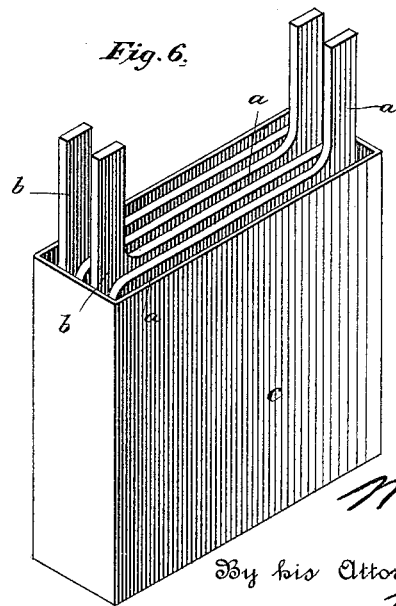
Witnesses
Geo. W. Breck
Edward Thorpe
Inventor
Wm N. Griscom
By his Attorney
Wm B. Vansize

UNITED STATES PATENT OFFICE.

WILLIAM W. GRISCOM, OF HAVERFORD COLLEGE, PENNSYLVANIA, ASSIGNOR TO THE ELECTRICAL ACCUMULATOR COMPANY, OF NEW YORK.

ART OF PREPARING ELEMENTS FOR SECONDARY BATTERIES.

SPECIFICATION forming part of Letters Patent No. 405,733, dated June 25, 1889.

Application filed September 23, 1887. Serial No. 250,470. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in Secondary Batteries, of which the following is a specification.

My invention relates to an improvement in the method of preparing elements or electrodes used in secondary batteries of the Faure type.

In the manufacture of batteries according to the process of Gaston Planté it was desirable to use a plate having considerable porosity, so that the surface thereof could be readily attacked by the electrolytic action to which the plate was subjected for the purpose of increasing the porosity or absorptive quality of its surface. Later, in the manufacture of such batteries according to the improvement of M. Faure, it was thought advantageous to apply the absorptive material to a plate or support having as great porosity as possible, so that the electrolytic action upon the plate or support would continually increase the capacity of the element. While this may be advantageous to a certain extent, my experiments and the experience gained by practical application of secondary batteries in the arts have demonstrated that the use of a porous plate or support, while possibly increasing the capacity in time, causes a deterioration and weakening of the support-plate, which shortens the period of efficiency. To avoid this evil and to render the battery more durable and efficient, I construct support-plates consisting of any suitable metal, as lead, which I subject to compression between dies shaped to impart the desired form to the plate or support. I prefer to construct a plate according to my method having uniformly-arranged holes or perforations. The walls or divisions between the holes or perforations I compress in all directions by the use of power-operated dies, as described. I then remove the remaining webs or filaments and apply a paste containing an oxide of lead. The tensile strength and conductivity of such a plate or support is much increased, as compared with cast-lead, for instance, and its durability is greatly increased by reason of the fact that it is not so easily affected by the electrolytic action or process of charging to which the active coating is subjected.

I have described my method of constructing elements of the well-known perforated plate of the Swan and Sellon type. To construct such a plate according to my method, I provide two dies composed of a series of teeth or projections having the form of a truncated pyramid, each tooth in length being about one-half the thickness of the finished plate. These dies are to be operated by power. I have shown them fixed or arranged upon the surfaces of rollers. The teeth or projections forming the dies are so disposed as to resemble the arrangement of the holes or perforations desired for the completed plate. A cutting or knife edge having the outline or contour of the desired plate surrounds the group of teeth or projections. The teeth or projections on the two dies are so fixed upon the rollers that they will register with each other. The rollers carrying the dies are placed the proper distance apart, and are rotated by the application of the proper motive power—steam or hydraulic. Lead or the desired variety of metal is fed into the rollers and emerges in the form of a plate or support, determined by the form of die used. At or near the center of the plate so formed at the meeting-point of the teeth or projections there is usually remaining a thin web or scale of metal. To remove this web or scale, I pass the plate through a second pair of rollers furnished with a die having teeth or projections arranged like those of the first die, but of sufficient length to pass the meeting-point of the teeth of the first pair of dies. Upon the opposite side of the plate there is arranged a plain surface—as a roller or cylinder—to support the plate during the operation of punching out the remaining webs or scales. This may be a plane surface or any arrangement which will support the perforated plate and prevent the deformation, bending, or breaking of the walls or divisions. By the use of dies formed as described the walls or divisions between the holes or perforations are subjected to pressure from all directions, and a uniformly smooth and finished surface is secured. To plates or supports so formed I apply an active material, as an oxide of lead in the form of a paste containing oxide of lead and dilute sulphuric acid. The battery element prepared in this way has greater conductivity and greatly-increased durability.

The accompanying drawings illustrate my invention.

Figure 1 shows the dies applied to rollers. Fig. 2 is the produced surface of the die. Fig. 3 shows the appearance of a section of the plate after passing through the first dies. Fig. 4 shows the same when the second step is completed. Fig. 5 shows the completed plate, and Fig. 6 shows the plates assembled in the containing-cell.

Referring to Figs. 1 and 2, R and R' are two rollers, of hardened or tempered metal, carrying upon their surfaces dies having registering teeth or projections P P'. Fig. 2 is the produced surface of the roll or the die, and shows the cutting-edge $k$ properly disposed to give the required outline to the plate, also showing the teeth or projections. These, in constructing the form of plate here selected for illustration, are in the form of truncated pyramids P, the height of each being equal to one-half the thickness of the completed plate. In compressing a metal, as lead, into a form or die it is almost impossible to produce clean-cut forms clear and clean from remnant webs, walls, or filaments; but such webs, walls, or filaments are extremely frail and are easily and clearly removed by comparatively slight pressure, as by bringing them into contact with a punch or projection. For this purpose I provide a die having teeth or projections with the same arrangement or disposition as those of the first die, each tooth or projection being of sufficient length to pass the meeting-point of the projections on the first-named dies. This die I place upon a second roller $r$, operating in connection with a roller $r'$, having a plain surface to support the walls or divisions of the perforated plate. The two pair of rollers carrying the dies, as described, are so located with respect to each other that the projections of one die will enter the perforations in the form produced by the first die at precisely the same point in each and every succeeding plate. This is done by gearing the two pairs together.

The operation is as follows: The proper motive power being applied to the rollers, they rotate in unison in the direction indicated by the arrows. Lead or the desired metal is fed into the die-rollers R R', where it is pressed into the form indicated by the section shown in Fig. 3. $m$ shows the remaining webs at the meeting-point of the dies, and the completed plate $a$, Fig. 5, shows the preferred outline. The plate $a$, containing webs $m$, now passes through the press or rollers $r\ r'$. The teeth or projections $p$, of $r$ enter the perforations of the plate $a$ to a point beyond the webs $m$, which are thus punched out, as shown in the section Fig. 4, $n$ indicating the completed perforation having a double-bevel outline. In Fig. 5 the completed plate is shown with active material applied to a portion of its perforations, and in Fig. 6 there is shown a cell $c$, containing two positive elements $a$ and two negative elements $b$, each having a mechanically-applied active material, as an oxide of lead.

I do not herein claim the combination of two power-operated dies composed of a series of registering teeth or projections, and two rolls or cylinders, one of which has a series of teeth or projections arranged to enter the perforations made by the dies to a point beyond the meeting-point of such dies, as that forms the subject-matter of another application.

What I claim, and desire to secure by Letters Patent, is—

1. The herein-described improvement in the art of preparing elements for secondary batteries, consisting in passing a suitable plate, slab, or ingot of conducting material—such as lead—between suitable dies, whereby the plate, slab, or ingot is compressed into the form of a plate or support having cells, grooves, or receptacles separated by partitions or walls, and then applying an active or absorptive material, substantially as described.

2. The herein-described improvement in the art of preparing elements for secondary batteries, consisting in passing a suitable plate, slab, or ingot of conducting material—such as lead—between suitable dies, whereby the plate, slab, or ingot is compressed into the form of a plate or support having cells, grooves, or receptacles separated by partitions or walls having remnant webs, fins, or scales, removing such webs or scales, and then applying an active or absorptive material, substantially as described.

3. The herein-described improvement in the art of preparing elements for secondary batteries, consisting in passing a suitable plate, slab, or ingot of conducting material—such as lead—between suitable dies, whereby the plate, slab, or ingot is compressed into the form of a plate or support having cells, grooves, or receptacles separated by partitions or walls having remnant fins, webs, or scales, then punching or breaking away such remnant fins, webs, or scales and applying an active material, substantially as described.

4. The herein-described improvement in the art of preparing elements for secondary batteries, consisting in passing a suitable plate, slab, or ingot of lead under a suitable die, whereby the plate, slab, or ingot is compressed into the form of a plate or support having cells, grooves, or receptacles separated by partitions or walls having remnant fins, webs, or scales, then removing the said webs or scales and applying an active or absorptive material, substantially as described.

Signed at New York, in the county of New York and State of New York, this 21st day of September, A. D. 1887.

WM. W. GRISCOM.

Witnesses:
DANIEL E. DELAVAN,
WM. B. VANSIZE.